United States Patent [19]

Sheridon

[11] Patent Number: 5,731,792
[45] Date of Patent: Mar. 24, 1998

[54] ELECTROCAPILLARY COLOR DISPLAY SHEET

[75] Inventor: Nicholas K. Sheridon, Los Altos, Calif.

[73] Assignee: Xerox Corporation, Stamford, Conn.

[21] Appl. No.: 643,671

[22] Filed: May 6, 1996

[51] Int. Cl.$^6$ .................................................. G09G 3/34
[52] U.S. Cl. .................................................. 345/84; 345/107
[58] Field of Search .................................... 345/84, 107, 85, 345/86, 60, 55, 30, 105, 106; 359/290, 291, 228

[56] References Cited

U.S. PATENT DOCUMENTS

| | | | |
|---|---|---|---|
| 4,126,854 | 11/1978 | Sheridon | 345/107 |
| 4,203,106 | 5/1980 | Dalisa | 345/107 |
| 4,583,824 | 4/1986 | Lea | 359/228 |
| 5,041,824 | 8/1991 | Disanto et al. | 345/107 |
| 5,389,945 | 2/1995 | Sheridon | 345/107 |
| 5,561,443 | 10/1996 | Disanto et al. | 345/107 |
| 5,659,330 | 8/1997 | Sheridon | 345/107 |

*Primary Examiner*—Xiao Wu
*Attorney, Agent, or Firm*—Fariba Rad

[57] ABSTRACT

An electrocapillary color display sheet is disclosed which utilizes three spaced apart and parallel sheets in which the medial sheet has a plurality of sets of at least two reservoirs. Each reservoir in each set holds a different color polar liquid and each liquid in each reservoir has an individual electrical contact. By selectively activating each liquid in each reservoir of each set of reservoirs, the activated liquid of the set of reservoirs will flow into a space commonly shared by the liquids of that set of reservoirs to create a colored pixel. Deactivating the liquids will cause each liquid to retreat back into its reservoir which in turn clears the colored pixel.

9 Claims, 9 Drawing Sheets

ELECTROCAPILLARY COLOR DISPLAY SHEET

BACKGROUND OF THE INVENTION

This application relates to U.S. patent application Ser. No. 08/581,136, now abandoned, "Electrocapillary Display Sheet" (Common Assignee).

This invention relates to electrocapillary color display sheets and more particularly concerns an electrocapillary display sheet which utilizes plurality of sets of reservoirs in which each reservoir of each set of reservoirs holds a different color polar liquid. An individual electrical connection is in contact with each liquid in each reservoir. By selectively activating the liquids of each set of reservoirs, at least one of the liquids of the set of reservoirs will flow into a space commonly shared by the liquids of that set of reservoirs to create a colored pixel.

Typically, a display device, in sheet form, comprises a thin sheet which has many attributes of a paper document. It looks like paper, has ambient light valve behavior like paper (i.e. the brighter the ambient light, the more easily it may be seen), is flexible like paper, can be carried around like paper, can be written on like paper, can be copied like paper, and has nearly the archival memory of paper.

There have been different approaches to make a field induced display sheet such as U.S. Pat. No. 4,126,854 titled "Twisting Ball Panel Display" in which the display panel is comprised of a plurality of spherical particles which have different colors on each hemisphere. Depending on the direction of an electric field applied to each spherical particle, one of the hemispheres will be displayed. In this approach, for black and white display sheets, each ball has a black hemisphere and a white hemisphere. The black and white hemispheres of the spherical particles can be selected in such a manner to display a desired image or text.

It is an object of this invention to provide a different approach to make a field induced display sheet.

SUMMARY OF THE INVENTION

There is disclosed an electrocapillary color display sheet which utilizes three transparent sheets being spaced from each other and placed parallel to each other. The medial sheet has a plurality of sets of at least two reservoirs in which each reservoir of each set is filled with a different color dyed or pigmented polar ink. Each liquid in each one of the reservoirs has an individually addressable electrical connection. By selectively activating each liquid of each set of reservoirs, the activated liquid of the corresponding set of reservoirs will flow out into a space commonly shared by the liquids of that set of reservoirs to create a colored pixel. Deactivating the liquids will cause each liquid to retreat back into its reservoir which in turn clears the colored pixel.

DETAILED DESCRIPTION OF THE INVENTION

Figure 1:
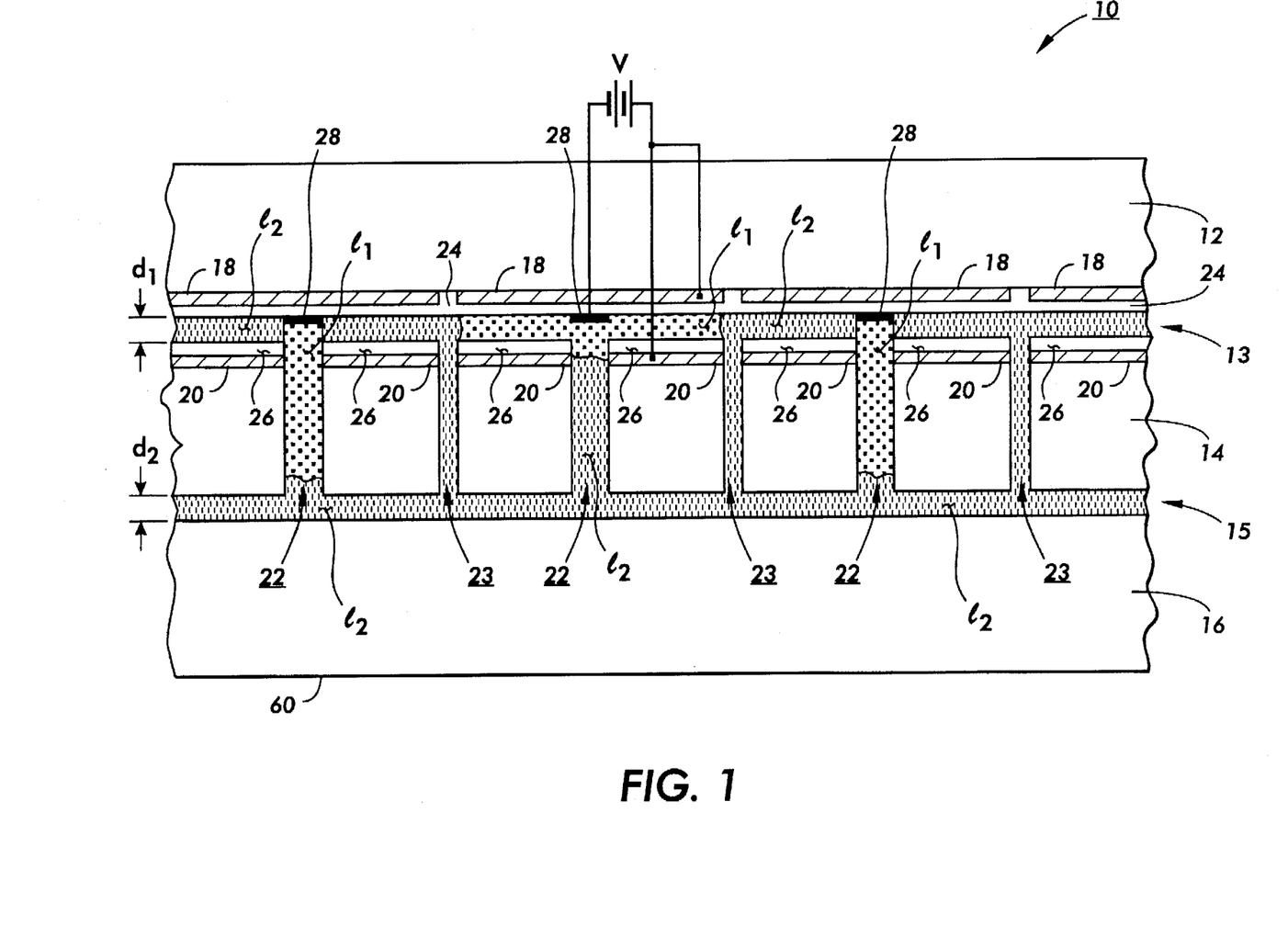
FIG. 1 shows a cross sectional view of an electrocapillary display sheet of this invention.

Referring to FIG. 1, there is shown a cross sectional view of an electrocapillary display sheet 10 of this invention. The electrocapillary display sheet 10 comprises three transparent and insulating sheets 12, 14 and 16 such as glass or Mylar. Sheets 12, 14 and 16 are substantially parallel to each other and they are spaced from each other. The distance $d_1$ between sheet 12 and 14 and the distance $d_2$ between the sheets 14 and 16 both are in the range between 0.0001 and 0.05 inches. Hereinafter, for the purpose of simplicity, "electrocapillary display sheet" will also be referred to as "display sheet".

Figure 2:
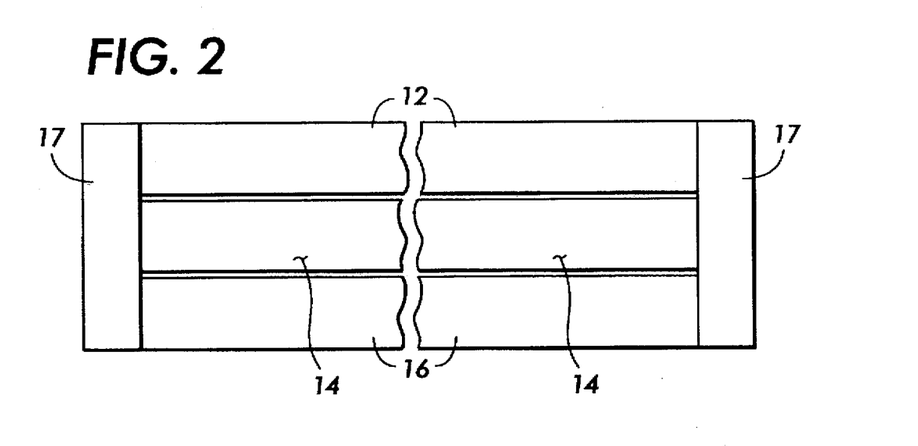
FIG. 2 shows an example of a method of bonding different sheets of FIG. 1 together.

Referring to FIG. 2, there is shown an example of a method of bonding sheet 12, 14 and 16 together. The sheets 12, 14 and 16 are suitably spaced from each other and bonded to a frame 17 that runs around the periphery of the display sheet 10. If the frame 17 and the sheets 12, 14 and 16 are glass, bonding might be done by means of a glass frit painted onto joining surfaces and subsequently heated to its melting temperature. The bonding might also be done with epoxy or some other bonding resin. If the sheets 12, 14 and 16 are all made of a plastic material, such as Teflon or Mylar, the bonding might be a heat weld, accomplished by means well known in the art.

Since the frame 17 runs around the periphery of the display sheet 10, it seals the spaces 13 and 15 which are located between sheets 12 and 14 and sheets 14 and 16 respectively.

Referring back to FIG. 1, a plurality of electrodes 18 are placed on sheet 12 where it faces sheet 14 and a plurality of electrodes 20 are placed on sheet 14 where it faces sheet 12. Electrodes 18 and 20 generally must be made from a transparent material such as Indium/tin oxide (ITO) or tin oxide. Electrodes 18 and 20 can be selected to have different shapes such as square or circular. However, the shape of both electrodes 18 and 20 have to be selected to be identical. In the preferred embodiment of this invention, both electrodes 18 and 20 are selected to be square with rounded corners. Each one of the electrodes 18 of sheet 12 is aligned with a corresponding electrode 20 from sheet 14.

Figure 3:
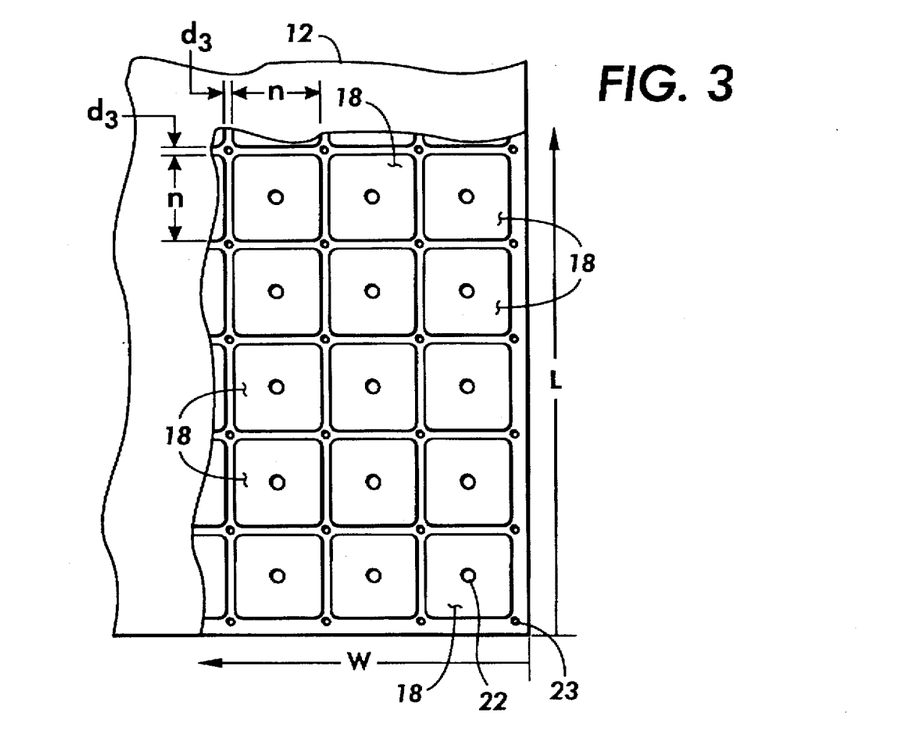
FIG. 3 shows a portion of the top view of the electrocapillary display sheet of FIG. 1.

Referring to FIG. 3, there is shown a portion of the top view of the electrodes 18 of sheet 12. The electrodes 18 of sheet 12 are placed next to each other in such a manner that they form parallel lines both along the width W and the length L of the surface of sheet 12. The electrodes 18, of dimension n by n, are placed at a distance $d_3$ away from each other. Since each electrode has the same size as the size of a pixel, the dimension n is defined by the size of the pixels. Distance $d_3$ is in the range between 0.001 n and 0.05 n.

It should be noted that electrodes 20 of the sheet 14 have the same shape, size and arrangement as the electrodes 18 of sheet 12.

Referring back to FIG. 1, sheet 14 has a plurality of reservoirs (storage to hold liquid) 22. The reservoirs 22 are created by forming a hole, preferably at the center C of each electrode 20, which extends through the thickness $W_1$ of the sheet 14. In addition, sheet 14 has a plurality of holes 23 which are formed to extend through the thickness $W_1$ preferably where there is a space between four adjacent electrodes 20 of sheet 14. However, holes 23 can be placed between two adjacent electrodes 20 of sheet 14. Holes 23 provide a communicating path between the sealed spaces 13 and 15.

Sheet 12, where faces sheet 14, has a layer 24 of low surface energy insulator. The low surface energy insulator layer 24, which is placed over the electrodes 18 of the sheet 12, covers the entire surface of the sheet 12. In the same manner, a low surface energy insulator layer 26, which is placed over the electrodes 20 of the sheet 14, covers the entire surface of the transparent sheet 14 while leaving the reservoirs 22 and the holes 23 open. The low surface energy insulator layers 24 and 26 may be a layer of Teflon (DuPont Co.) or other perfluorinated polymer, bonded to the sheets 12 and 14 as a sheet or deposited by a sputtering or chemical vapor deposition process. They can also be a silicone elastomer such as Sylgard 184 manufactured by the Dow Corning Co. Furthermore, they may be a two or more layer structure such as Parylene (a product of the Union Carbide Co.) overcoated with a perfluorinated polymer such as Fluorad FC725 manufactured by the 3M Co.

In addition, a plurality of high surface energy plates 28 made from a material such as evaporated or sputtered gold, platinum, indium/tin oxide, or nickel are placed over the low surface energy insulator layer 24 of the sheet 12 only on the areas which are aligned to be above the reservoirs 22 of the sheet 14. In the preferred embodiment of this invention, the shape of the high surface energy plates 28 is the same as the shape of the cross section of the reservoirs which is a circle.

It should be noted that the electrodes 18 and 20, and the low surface energy insulators 24 and 26 are all transparent. The high surface energy plates 28 may also be transparent.

The reservoirs 22 are filled with dyed polar liquid $l_1$ such as water, alcohol, acetone, formamide, ethylene glycoy and mixtures of these and other suitable liquids.

The space (passage) 13 between the sheets 14 and 16, the space (passage) 15 between the sheets 12 and 14 and the holes 23 are filled with a low surface energy liquid $l_2$ such as Dow Corning 200 Series silicone oil, Exxon Isopar or 3M Fluorinert. The two liquids $l_2$ and $l_2$ are immiscible. The liquid $l_2$ may be clear, dyed or pigmented with a contrasting color to liquid $l_1$. The spaces 13, 15 and holes 23 may also be filled with a gas such as air.

Conductive liquids are polar and are generally miscible with one another. However, there are classes of non-conducting liquids that are not miscible with one another. Examples of these are the fluorocarbons, such as the 3M Fluorinerts, that are not miscible with most of the hydrocarbons, Dow Corning FS-1265 oil is also not soluble in hydrocarbons or the 3M Fluorinerts.

The dyed polar liquid $l_1$ in each reservoir adheres to the high surface energy plates 28 above the reservoir. The high surface energy plate 28 not only serves the purpose of maintaining the placement of the conductive liquid adjacent to the addressing electrodes 18 and 20, but also serves as a means of making electrical connection to the conductive liquid $l_1$. Since the high surface energy plates 28 provide electrical connection to liquid $l_1$, hereinafter, "the high surface energy plate" will be referred to as "connection plate".

This invention is based on a concept called "electrocapillarity". The electrocapillarity relates to changes in surface tension as a function of an applied electric field which is discussed in 'Surface Chemistry', by Lloyd I. Osipow, 1962, Reinhold Publishing Co., New York". The structure shown in FIG. 1 is designed to move the dyed polar liquid $l_1$ from one area into another by using effects related to the electrocapillary concept.

Figure 4:
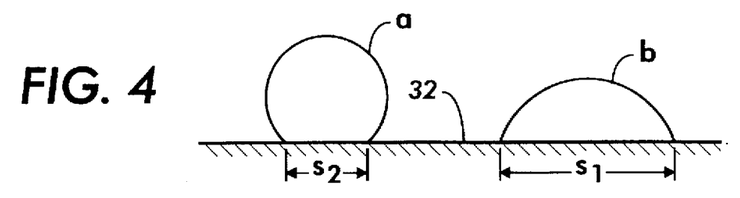
FIG. 4 shows two same size droplets a and b of two different kinds of liquid on a surface.

In order to comprehend the disclosed embodiment of this invention, it is necessary to study the electrocapillary concept. Referring to FIG. 4, there are shown two same size droplets a and b of two different kinds of liquid on a surface 32. As it can be observed, droplet b is spread out and droplet a is beaded up. As a result, droplet b occupies a larger surface area $S_1$ than the surface area $S_2$ which the droplet a occupies. The reason for the different surface areas of the two liquids is that each liquid has a certain energy relationship with the surface which results in a specific contact angle with respect to a given surface. The lower the interaction energy between the liquid and the surface, the larger the contact angle and the less the shared area.

Figure 5:
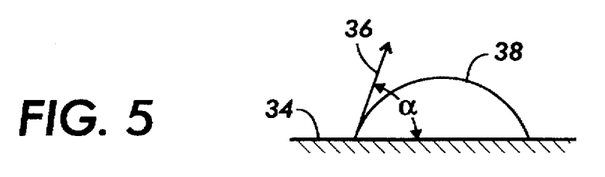
FIG. 5 shows the contact angle of a droplet of a liquid with respect to a surface.

Referring to FIG. 5, a contact angle α is an angle between the plane 34 of a surface and the tangent line 36 of a droplet 38 of a liquid. The contact angle of each liquid with respect to a given surface depends on the properties of that liquid for example, surface tension and the properties of the surface for example, surface energy.

Figure 6:
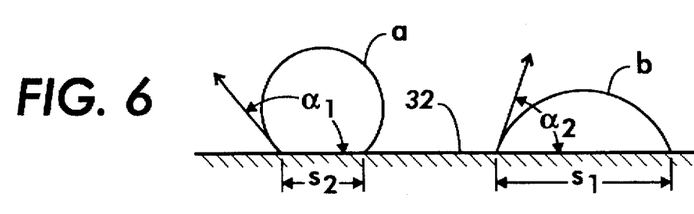
FIG. 6 shows the two droplets a and b of FIG. 4 with their contact angles α1 and α2.

Referring to FIG. 6, there is shown the two droplets a and b of FIG. 4 with their contact angles $α_1$ and $α_2$. Some liquids such as the liquid of droplet b have an acute contact angle $α_2$ which causes the droplet of that liquid to occupy a large surface $S_1$. However, some liquids such as the liquid of droplet a have an obtuse contact angle $S_1$, which causes a same size droplet of one of these liquids to occupy a much smaller surface $S_2$ than the surface area $S_1$ occupied by liquids with acute contact angles.

Figure 7:
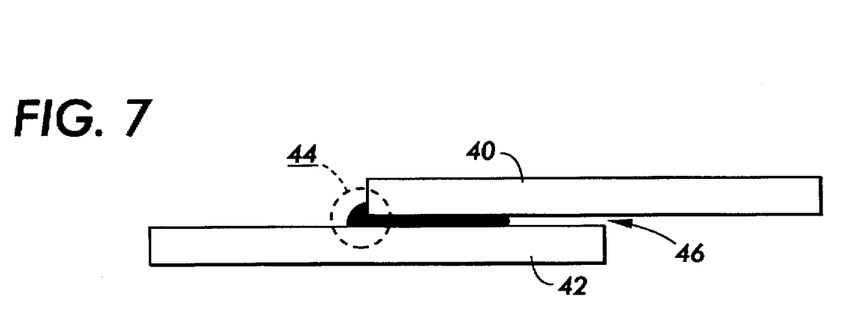
FIG. 7 shows a droplet of a liquid which spreads into a space created by two parallel plates.
Figure 8:
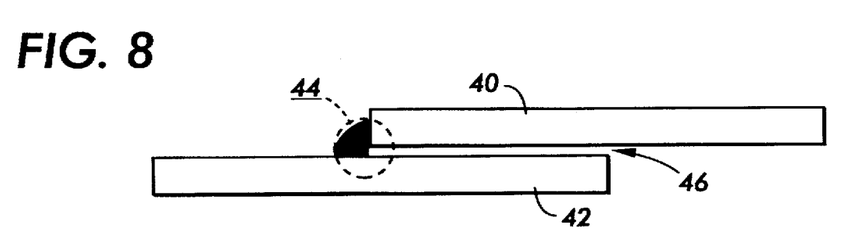
FIG. 8 shows a droplet of a liquid which does not spread into a space created by two parallel plates.

Referring to FIG. 7, there is shown two plates 40 and 42 which are placed parallel and spaced from each other in such a manner as to create a step. Through extensive experiments, it has been determined that if a droplet of a liquid which has a contact angle less than about 95 degrees is placed in the corner 44 created by the step, the droplet will spread into the space 46 between the two parallel plates 40 and 42. However, referring to FIG. 8, if the droplet of a liquid which has a contact angle above about 95 degrees is placed at corner 44, the droplet will not spread.

Figure 9:
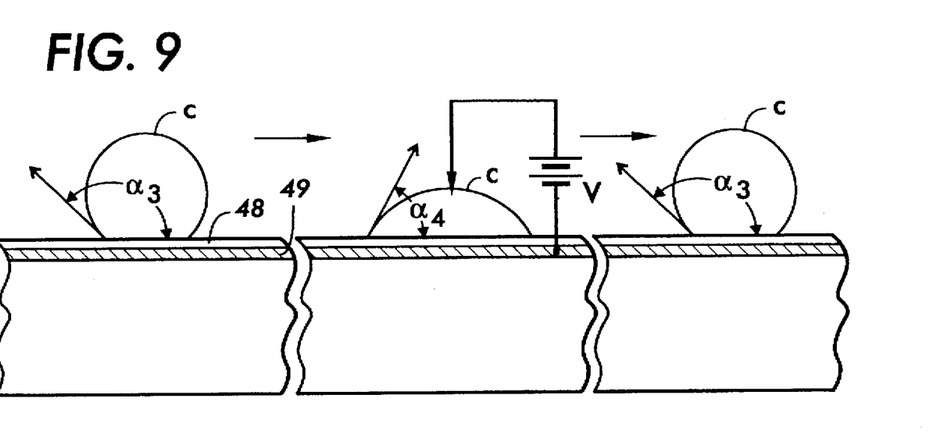
FIG. 9 shows that by applying a voltage to the droplet of a liquid, the contact angle of the droplet can be changed.

Furthermore, referring to FIG. 9, through extensive experiments it has been determined that by applying a voltage V between a droplet c located on a thin insulative surface 48 and an electrode 49 (directly under the surface 48) an electric field is created which causes, the contact angle to be changed and, depending on the voltage applied to the liquid, the contact angle can be modified to a desired angle.

In FIG. 9, from left to right, droplet c is shown prior to applying a voltage V, during application of a voltage V and after removal of the voltage V. As can be observed, prior to applying a voltage V the droplet c is beaded up and has an obtuse angle $\alpha_3$. During the application of the voltage V, the contact angle of droplet c changes to an acute angle $\alpha_4$ and as a result, the droplet expands. After removal of the voltage V, the contact angle of the droplet changes to its original obtuse angle $\alpha_3$ and as a result the droplet beads up again.

It should be noted that if the voltage is turned off, the charges remain in the droplet and the electrodes, as a result, the droplet will remain spread. However, if the droplet and the electrodes are discharged, then the liquid will bead up. In this specification the term "electric field is removed" shall mean "the liquid, its corresponding electrodes and electrical connection means to the liquid are discharged".

Modifying a contact angle from an obtuse angle $\alpha_3$ to an acute angle $\alpha_4$ causes the droplet c to occupy a larger surface area $S_3$ than its original surface area $S_4$ (the surface that a droplet occupies prior to the application of an electric field). Once the voltage is removed, the droplet c will contract back to its original shape and surface area $S_4$. The experiments have shown that by applying a voltage V to liquids such as water and mercury on a surface such as silicone elastomer that overcoat a conductor, their surface areas can increase by a factor of 10. Furthermore, by utilizing surfaces such as Teflon coated Parylene, the surface areas of water or mercury can increase by a factor in the range between 20 and 30.

The concept of increasing the surface area of a liquid by applying a voltage has been used in this invention to expand the surface area of a dyed liquid in order to fill a surface area on demand.

In the preferred embodiment of this invention, the contact angle of the dyed polar liquid 11 with respect to the low surface energy insulator is selected to be more than 90 degrees. It is well known that the contact angle of a first liquid with respect to a surface is greatly enhanced if a second liquid, with a lower surface tension and immiscbile with the first liquid, is present. This phenomenon is shown in FIGS. 10 and 11.

Figure 10:
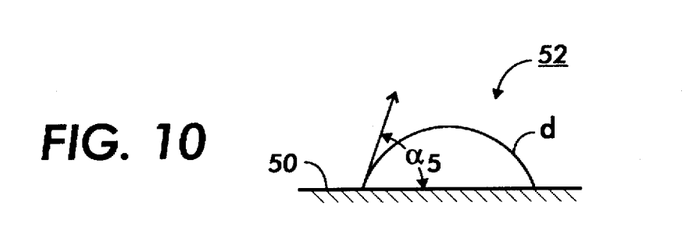
FIG. 10 shows a droplet which is surrounded by air and has an acute contact angle.
Figure 11:
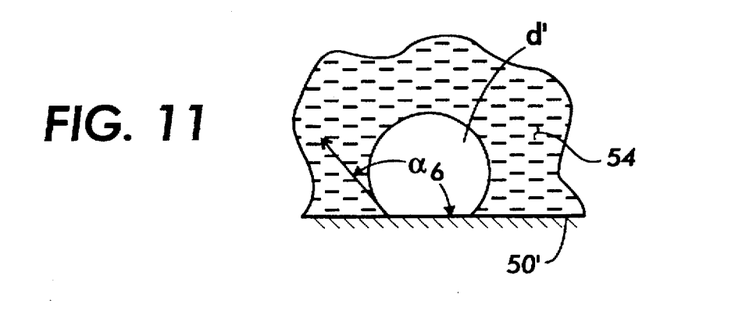
FIG. 11 shows the same droplet of FIG. 10 which is surrounded by a different liquid and now has an obtuse angle.

In FIG. 10, a droplet d of a liquid is placed on surface 50. The droplet d which is surrounded by air 52 has an acute contact angle $\alpha_5$. However, in FIG. 11, droplet d' which is the same as the droplet d of FIG. 10 is surrounded by a different liquid 54 and placed on the surface 50' which is the same as surface 50 of FIG. 10. In FIG. 11, as can be observed, liquid 54 has caused the droplet d' to have an obtuse angle $\alpha_6$. This effect can be utilized to greatly increase the number of polar liquid/low energy surface combinations which is very useful in the practice of this invention.

Referring back to FIG. 1, in operation, an individual voltage source which generates a voltage V is applied to each pair of electrodes 18 and 20 and to their corresponding liquid $l_1$ through the connection plate 28. It should be noted that for the purpose of simplicity, only the connection of one pair of electrodes 18 and 20 and their corresponding connection plate 28 to a voltage V is shown. However, it should be noted that an individually addressable electric field is applied to each pair of electrodes 18 and 20 and their corresponding connection plate 28. When an individual voltage V is applied to electrodes 18 and 20 and their corresponding connection plate 28 an electric field is being generated between the electrodes 18 and 20 (electrodes 18 and 20 are activated) and their corresponding connection plate 28.

The voltage V can be either DC or AC. In the case of a DC voltage V, electrodes 18 and 20 are connected to the same polarity of the voltage V and the connection plate 28 is connected to the opposite polarity of the voltage V. Therefore, liquid 1, which receives its electrical connection through the connection plate 28, has the opposite polarity compared to the polarity of the electrodes 18 and 20.

In operation, once the voltage V is activated, the contact angle of the polar liquid $l_1$ with respect to the surfaces of the low surface energy insulators 24 and 26 decreases. It should be noted that low surface energy insulators 24 and 26 are over the electrodes 18 and 20 respectively. Therefore, the opposite polarity of liquid $l_1$ with respect to the polarity of the electrodes 18 and 20 directly under the low surface energy insulators 24 and 26 causes the contact angle of polar liquid $l_1$ to decrease. The decrease in the contact angle causes the polar liquid $l_1$ to be pumped into the space 13 between sheets 12 and 14.

The dyed polar liquid $l_1$ occupies the space 15 only within the perimeters of the electrodes 18 and 20. As the expanding liquid $l_1$ approaches the perimeters of the electrodes 18 and 20, the strength of the electric field between this liquid $l_1$ and the electrodes 18 and 20 falls off, causing the contact angle of liquid $l_1$ with respect to the surfaces of the low surface energy insulators 24 and 26 to increase. This increase in contact angle will cause the further expansion of the liquid to cease.

When the liquid $l_1$ moves into the space 13, it causes the liquid $l_2$ in the space 13, holes 23 and the space 15 to move and flow into the reservoirs 22 from the opening of the reservoir into the space 15 in order to equilibrate the liquid $l_1$ and the liquid $l_2$.

Once a voltage V is activated, the dyed polar liquid $l_1$ occupies the area between electrodes 18 and 20 and therefore the area between electrodes 18 and 20 will be seen as a colored pixel or subpixel. By removing the electric field created by the voltage V, the contact angle of the liquid $l_1$ with respect to the surfaces of the low surface energy insulators 24 and 26 increases, causing the dyed polar liquid $l_1$ to retreat back to the reservoir where it adheres only to the connection plate 28 which it wets. Once an electric field is removed, since the dyed polar liquid retreats back to the reservoir, the area under that electrode will be seen as a clear area. The diameter of the reservoir and therefore, the diameter of the high energy connection plate 28 is small enough to make the dyed polar liquid $l_1$ within the reservoirs 22 invisible. Therefore, by activating and removing the proper electric fields, an image can be displayed on the electrocapillary display sheet 10.

The voltage required to create an electric field adequate to move the liquid from the reservoirs is in the range between 5 volts and 300 volts.

The electrocapillary display sheet 10 requires a constant application of a pattern of addressing voltages V in order to continuously display an image. An active matrix addressing circuit can provide such a retained voltage pattern.

In order to utilize the electrocapillary display sheet 10 of this invention as a paper surrogate, the bottom surface 60 of sheet 10 has to be either coated with a material of a contrasting color compared to the color of the polar liquid $l_1$ or brought into contact with such a surface. If a light color is selected for the bottom surface 60 and the dyed polar liquid is selected to be dark, the electrodes 18 and 20 with an activated field will appear as dark pixels or subpixels depending on the size of the electrodes 18 and 20. However, the electrodes 18 and 20 with a removed electric field will appear as clear pixels. For example, if the dyed polar liquid $l_1$ is dyed black and the surface 60 is coated white, then the electrodes 18 and 20 with an activated electric field will appear as black on a white background. The electrodes 18 and 20 with a removed electric field will appear as white since the white background can be seen through the clear electrodes 18 and 20. This will have the physical appearance of black ink on white paper.

It should be noted that since the size of the reservoirs is very small in the range between 0.1% and 10% of the area of the pixel, the ink in the receivers is substantially invisible.

Furthermore, the electrocapillary display sheet 10 of this invention can be utilized as a transparent display to be placed on a projector to project the image of the electrocapillary display sheet 10 onto a screen. Therefore, on the screen only the projected image of the electrodes 18 and 20 with an active electric field will be seen as dark pixels or subpixels depending on the size of the electrodes. The electrodes with a removed electric field appear clear and the light passing through these electrodes forms a bright image on the screen.

Figure 12:
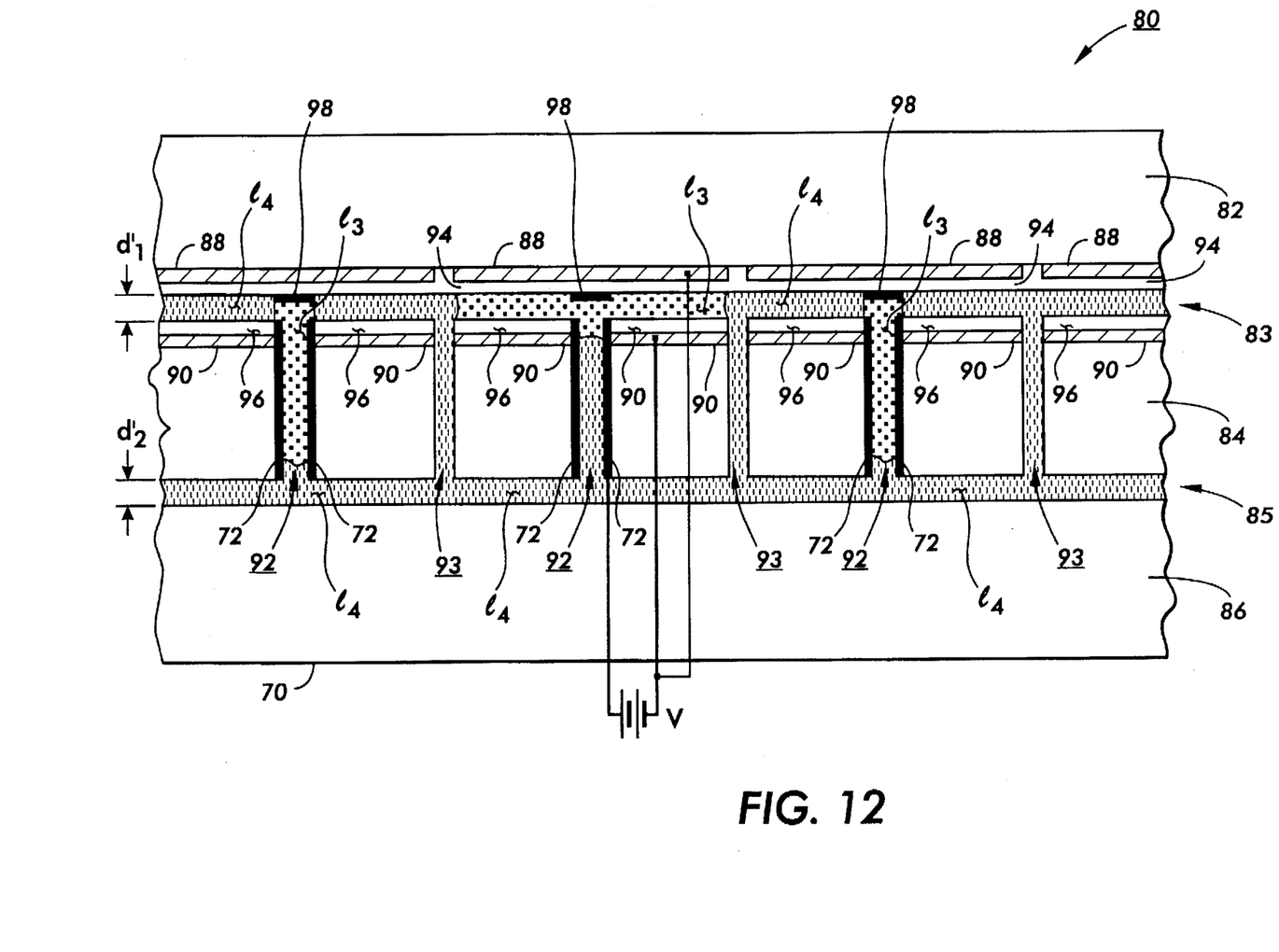
FIG. 12 shows an alternative electrocapillary display sheet of this invention.

Referring to FIG. 12, there is shown yet another alternative electrocapillary display sheet 80 of this invention. In FIG. 12, the elements 82, 83, 84, 85, 86, 88, 80, 92, 93, 94, 96, 98, $l_3$ and $l_4$ are the same and serve the same purpose as the elements 12, 13, 14, 15, 16, 18, 20, 22, 23, 24, 26, 28, $l_1$ and $l_2$ of FIG. 1 respectively. In FIG. 12, the connection plates 98 are no longer used to provide electrical connection to liquid $l_3$. However, they are placed above the reservoirs in order to cause the liquid $l_3$ to rise and adhere to the plates 98. Instead of the connection plates 98, a conductive coating 72 is placed on the walls of the reservoirs 22 via plating or any other well known methods which will be used to provide electrical connection to liquid $l_3$.

In FIG. 12, the voltage $V_1$ is applied to electrodes 88 and 90 and their corresponding liquid $l_3$ through the conductive coating 99. The electrodes 88 and 90 are connected to the same polarity of the voltage $V_1$ and the conductive coating 99 which provides the electrical connection to liquid $l_3$ is connected to the opposite polarity of the voltage $V_1$.

Figure 13:
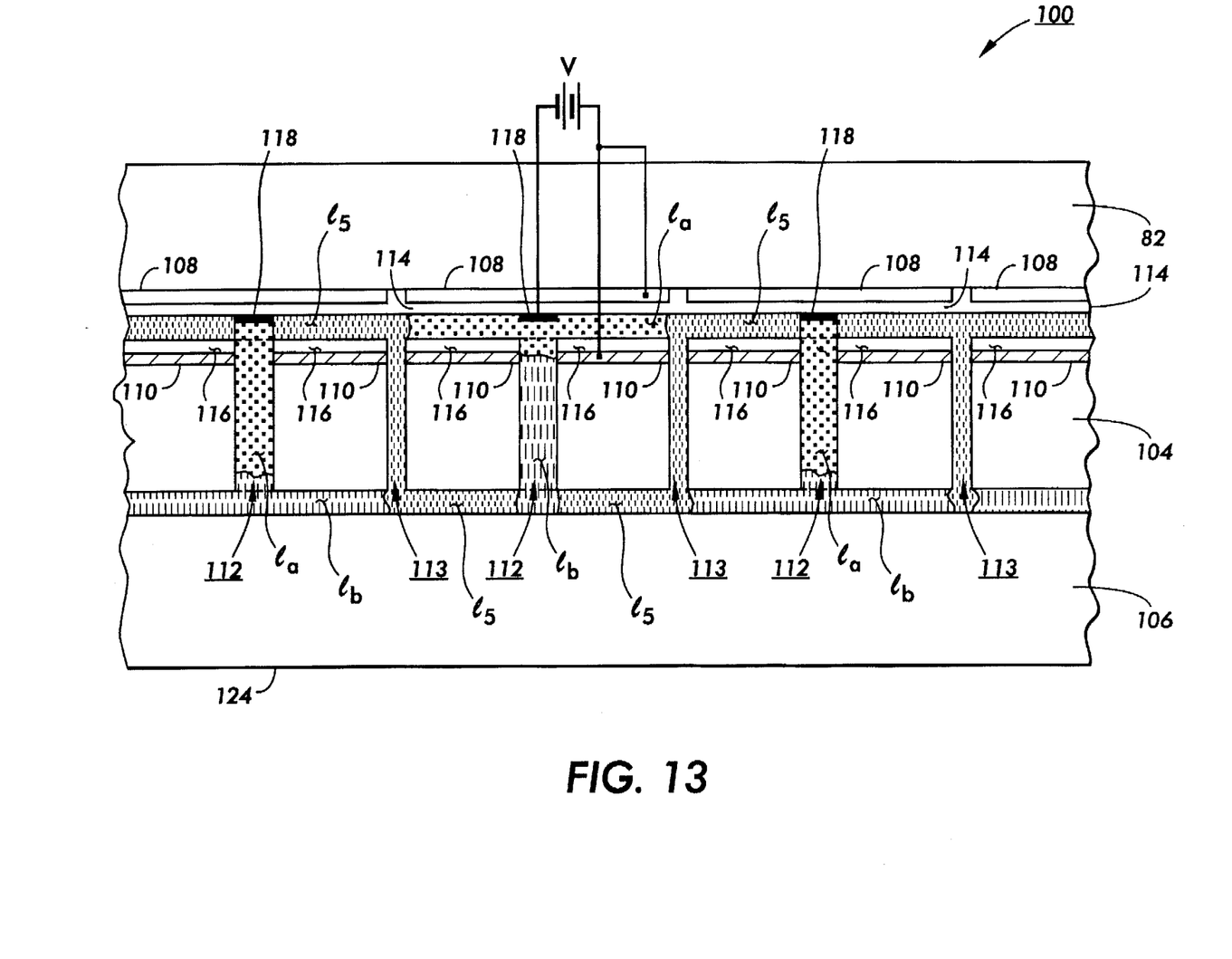
FIG. 13 shows yet an alternative electrocapillary display sheet of this invention.

Referring to FIG. 13, there is shown yet another alternative electrocapillary display sheet 100 of this invention. In FIG. 13, the elements 102, 103, 104, 105, 106, 108, 100, 112, 113, 114, 116, 118 and $l_5$ are the same and serve the same purpose as the elements 12, 13, 14, 15, 16, 18, 20, 22, 23, 24, 26, 28 and $l_1$ of FIG. 1 respectively. In the electrocapillary display sheet 100, liquid $l_1$ of FIG. 1 is replaced by two liquids $l_a$ and $l_b$. Liquid $l_a$ is a clear conductive liquid. However, liquid $l_b$ is a dyed or pigmented non-conductive liquid. Furthermore, liquids $l_5$, $l_a$ and $l_b$ are all immiscible liquids. Liquid $l_b$ is placed under liquid $l_a$ in such a manner that once liquid $l_a$ flows into the space 103 only in the area directly between the electrodes 108 and 110 and a portion of the reservoir 112 liquid $l_b$ is fully retreated into the reservoir 92.

In operation, once a voltage $V_2$ is applied to electrodes 108 and 110 and the connection plate 118, the conductive liquid $l_a$ which is in contact with connection plate 118 spreads into space 103 and fills the space between the electrodes 108 and 110. Once the liquid $l_a$ flows out of reservoir 112, liquid $l_b$ moves into reservoirs 112. In the mean time, the liquid $l_5$ will fill in the space 120 (within the space 105 directly under electrodes 108 and 110). Upon removal of the voltage $V_2$, liquid $l_a$ retreats back into reservoir 112 and therefore liquid $l_b$ flows out to fill the space 120 while pushing out the liquid $l_5$.

A viewer looking at the electrocapillary display sheet from the bottom surface 122, will see the dyed or pigmented liquid $l_b$ within the space 120 when the voltage $V_2$ is removed. Accordingly, the space 120 will be seen as a pixel in the color of liquid $l_b$. However, when the voltage $V_2$ is activated, liquid $l_b$ retreats back into the reservoir 112 and clear liquid $l_5$ flows into the space 120. As a result, space 120 will be seen as a clear pixel.

Therefore, the electrocapillary display sheet 100 generates a pixel when an electric field created by an applied voltage $V_2$ is removed and it clears a pixel when an electric field is created by the applied voltage $V_2$. In contrast, the electrocapillary display sheet 10 of FIG. 1 generates a pixel when an electric filed is created by an applied voltage V and clears a pixel when the electric field created by an applied voltage V is removed.

Figure 14:
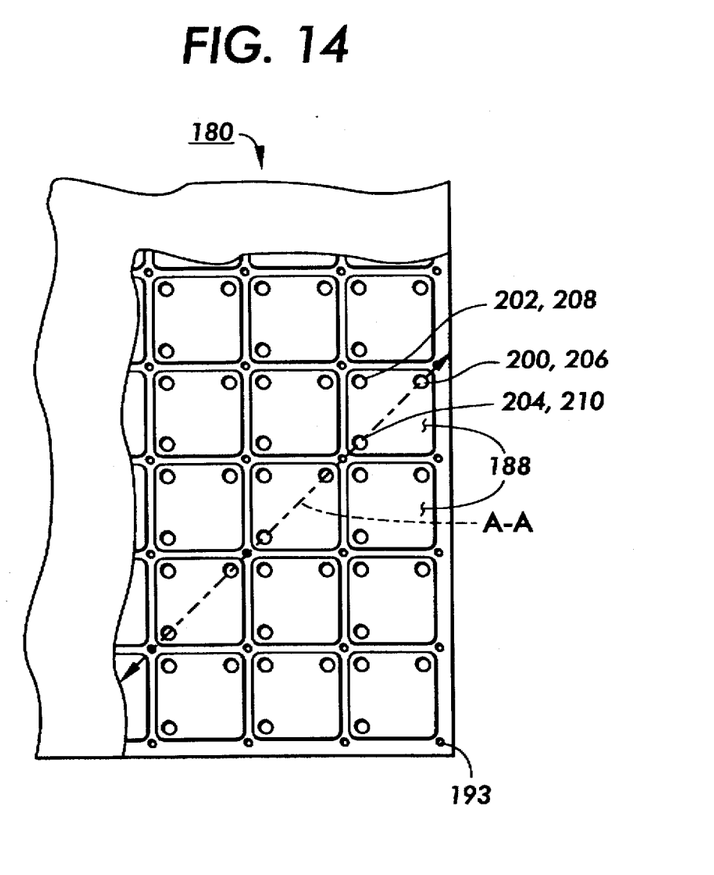
FIG. 14 shows a portion of the top view of the preferred embodiment of the electrocapillary color display sheet 180 of this invention.

The electrocapillary display sheets 10 and 80 of FIGS. 1 and 12 can be modified to display full color images. Referring to FIG. 14, there is shown a portion of the top view of the electrocapillary color display sheet 180 of this invention. In this approach, the sizes of the electrodes 188 are the same as the size of a pixel.

Figure 15:
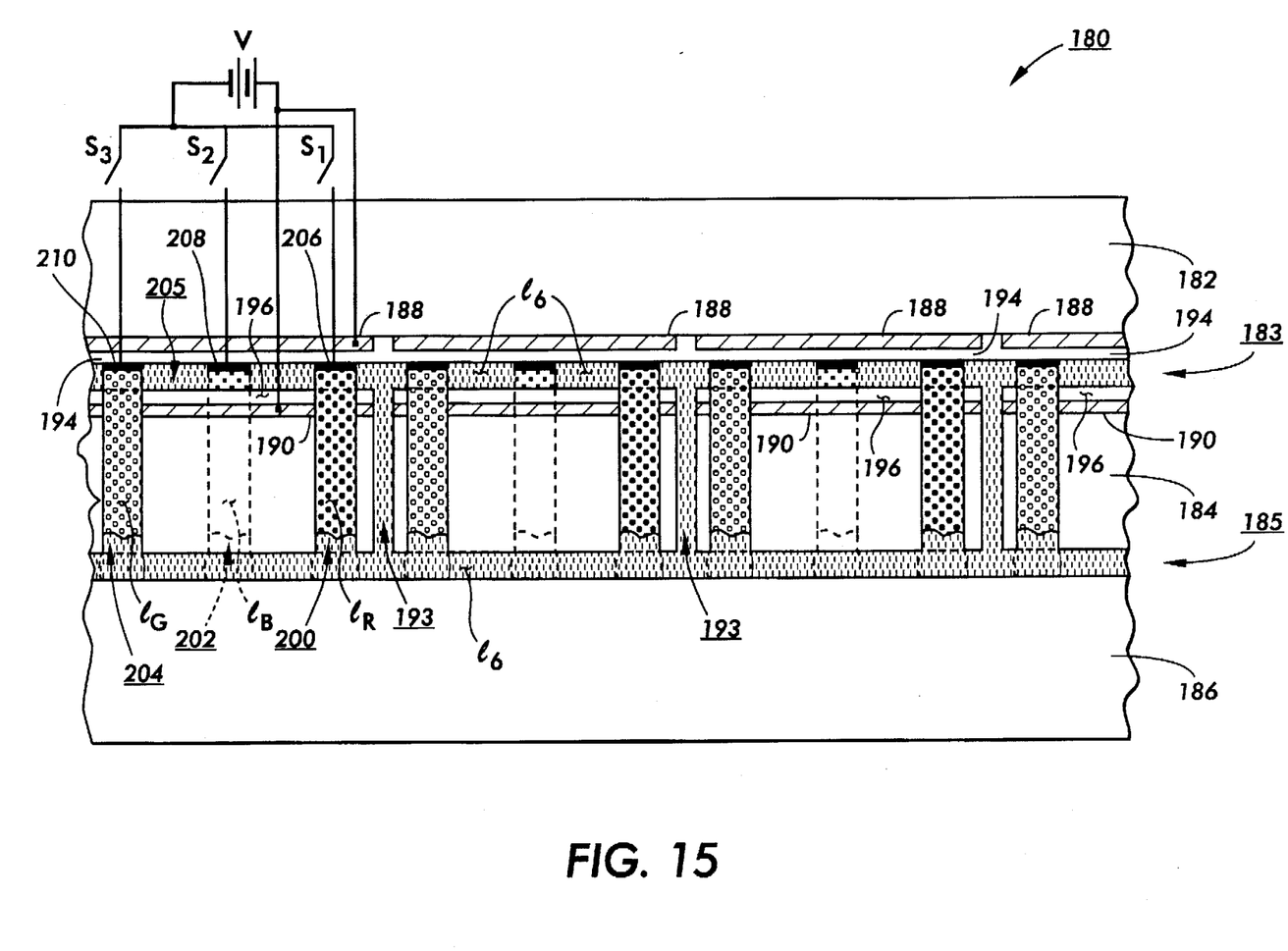
FIG. 15, shows a magnified cross sectional view of the disclosed embodiment of FIG. 14 along line A—A.

Referring to FIG. 15, there is shown a magnified cross sectional view of the disclosed embodiment of FIG. 14 along line A—A. In FIG. 15, the elements 182, 183, 184, 185, 186, 188, 193 and $l_6$ are the same and serve the same purpose as the elements 12, 13, 14, 15, 16, 18, 23 and $l_2$ of FIG. 1. Electrodes 190 and the layers 196 are the same as electrodes 20 and the layers 26 of FIG. 1 except each electrode 190 with its layer 196 has three reservoirs 200, 202 and 204. Since in the cross sectional view of FIG. 15 the reservoir 202 is not visible, it is shown by dashed lines. Each one of the reservoirs 200, 202 and 204 contains a different color ink $l_R$, $l_B$ and $l_G$ respectively.

It should be noted that since the reservoir 202 is not visible, the ink $l_B$ in the reservoir 202 is not shown. It should also be noted that the R, B and G in $l_R$, $l_B$ and $l_G$ represent red, blue and green. It should further be noted that any reservoir in each pixel can hold any of these three liquids and the order in which different color inks are placed in the reservoirs is not important.

Each reservoir 200, 202 and 204 has an individual connection plate 206, 208 and 210 respectively. In order to activate the ink in each reservoir, electrodes 188 and 190 are connected to one polarity of a power supply and each one of connection plates 206, 208 and 210 is connected to the opposite polarity of the power supply through individually addressable switches $S_1$, $S_2$ and $S_3$. Once a switch is closed, the electric field is being applied to a corresponding connection plate and the ink in the corresponding reservoir. Once an electric field is applied to an ink in a reservoir, the ink in the reservoir will rise and flow into the space 183 and stay only in space 205 (the portion of space 185 within the perimeters of electrodes 188 and 190). The ink from all three reservoirs 200, 202 and 204 will share the same space 205.

Once two or three different color inks occupy the same space, the pixel will be seen as the combination of those two or three different colors. With this approach any desired color pixel can be created. Furthermore, if the color of the pixel is desired to be the color of an ink in one of the reservoirs, then only the electric field for that reservoir will be turned on.

In FIG. 15, the space 183 is filled with a clear non-conductive liquid $l_6$ and the inks $l_R$, $l_B$ and $l_G$ are conductive immiscible liquids. While it is generally true that conductive (polar) liquids are at least partially immiscible, experience shows that the presence of the non-conductive liquid $l_6$ in combination with an appropriate surface active agent will effectively confer a high degree of immiscibility to the liquids $l_R$, $l_B$ and $l_G$, particularly if they have nearly the same specific gravity as the liquid $l_6$. We see this kind of stability in water-in-oil emulsions.

It should be noted that in the electrocapillary color display sheet of this invention, the red, blue and green inks can be replaced by any three complementary colors which can create the spectrum of colors.

It should also be understood that numerous changes in details of construction and the combination and arrangement of elements and materials may be resorted to without departing from the true spirit and scope of the invention as hereinafter claimed.

I claim:

1. A color display device comprising:

a first non-conductive sheet;

a second non-conductive sheet;

a sealed passage means between said first sheet and said second sheet;

said second sheet having at least two storage means opening into said passage means;

said first sheet having electrode means;

said second sheet having electrode means associated with said at least two storage means;

a liquid means of first color;

a liquid means of second color;

said liquid means of first color and said liquid means of second color both being conductive;

one of said at least two storage means holding said liquid means of first color and the other one of said at least two storage means holding said liquid means of second color;

a first conductive means for providing electrical connection to said liquid means of first color;

means for activating said first conductive means;

a second conductive means for providing electrical connection to said liquid means of second color;

means for activating said second conductive means;

means for activating said first sheet electrode means and said second sheet electrode means; and said electrode means of said first sheet, said electrode means of said second sheet, said first conductive means and said second conductive means being so constructed and arranged relative to each other and said storage means that when said electrode means of said first sheet, said electrode means of said second sheet and said first conductive means are activated, said liquid means of first color will flow into said sealed passage means, when said electrode means of said first sheet, said electrode means of said second sheet and said second conductive means are activated, said liquid means of second color will flow into said sealed passage means and when said electrode means of first sheet, said electrode means of said second sheet, said first conductive means and said second conductive means are activated, said liquid means of first color and said liquid means of second color both will flow into said sealed passage means.

2. A color display device comprising:

a first non-conductive sheet;

a second non-conductive sheet;

a sealed passage means between said first sheet and said second sheet;

said second sheet having a thickness and a plurality of sets of at least two holes extending at least through a portion of said thickness and opening into said passage means;

said first sheet having a plurality of electrodes;

said second sheet having a plurality of electrodes each associated with a corresponding one of said plurality of sets of at least two holes;

each one of said plurality of electrodes of said second sheet facing a corresponding one of said plurality of electrodes of said first sheet and being aligned with said corresponding electrode;

a liquid means of first color;

a liquid means of second color;

said liquid means of first color and said liquid means of second color both being conductive;

one of said holes of each set of said plurality of sets of at least two holes holding said liquid means of first color and the other hole of each set of said plurality of sets of at least two holes holding said liquid means of second color;

a plurality of first conductive means;

each of said plurality of first conductive means providing electrical connection to said liquid means of first color in a corresponding hole of a corresponding set of plurality of sets of at least two holes;

a plurality of second conductive means;

each of said plurality of second conductive means providing electrical connection to said liquid means of second color in a corresponding hole of a corresponding set of plurality of sets of at least two holes;

a plurality of first addressing means each of which being electrically connected to a corresponding one of said plurality of first conductive means;

means for activating selective ones of said plurality of first addressing means;

a plurality of second addressing means each of which being electrically connected to a corresponding one of said plurality of second conductive means;

means for activating selective ones of said plurality of second addressing means;

a plurality of electrode addressing means each of which being electrically connected to a corresponding one of said plurality of electrodes of said first sheet and to a corresponding electrode of said second sheet;

means for activating selective ones of said plurality of electrode addressing means; and said plurality of electrodes of said first sheet, said plurality of electrodes of said second sheet, said first conductive means and said second conductive means being so constructed and arranged relative to each other and said plurality of sets of at least two holes that when each one of said plurality of electrodes of said first sheet, a corresponding one of said plurality of electrodes of said second sheet and a corresponding one of said plurality of first conductive means are activated, said liquid means of first color in a corresponding hole will flow into said sealed passage means, when each one of said electrodes of said first sheet, a corresponding one of said plurality of electrodes of said second sheet and a corresponding one of said plurality of second conductive means are activated, said liquid means of second color in a corresponding hole will flow into said sealed passage means and when each one of said electrodes of said first sheet, a corresponding one of said plurality of electrodes of said second sheet, a corresponding one of said plurality of first conductive means and a corresponding one of said second conductive means are activated, said liquid means of first color in a corresponding hole and said liquid means of second color in a corresponding hole both will flow into said sealed passage means.

3. A color display device comprising:

a first non-conductive sheet;

a second non-conductive sheet;

a medial non-conductive sheet being located between said first and said second sheets;

a first sealed passage means between said first sheet and said medial sheet;

a second sealed passage means between said medial sheet and said second sheet;

said medial sheet having a thickness and a plurality of first type holes extending through said thickness and opening into each of said passage means;

said first type holes having a plurality of sets of at least two holes;

said first sheet having a plurality of electrodes;

said medial sheet having a plurality of electrodes each associated with a corresponding one of said plurality of sets of at least two holes;

each one of said plurality of electrodes of said medial sheet facing a corresponding one of said plurality of electrodes of said first sheet and being aligned with said corresponding electrode of first sheet;

said medial sheet having a plurality of second type holes extending through said thickness of said medial sheet and opening into each of said passage means for providing a communication path between said first sealed passage means and said second sealed passage means;

a liquid of first color;

a liquid of second color;

one of said holes of each said set of at least two first type holes holding said liquid of first color and the other one of said holes of each said set of at least two first type holes holding said liquid of second color;

said liquid of first color and said liquid of second color being immiscible with each other and each being conductive;

a plurality of first conductive means;

each of said plurality of first conductive means providing an electrical connection to said liquid of first color in a corresponding hole of a corresponding set of said plurality of sets of at least two first type holes;

a plurality of second conductive means;

each of said plurality of second conductive means providing an electrical connection to said liquid of second color in a corresponding hole of a corresponding set of said plurality of sets of at least two first type holes;

a fluid means;

said fluid means being immiscible with said liquid of first color and said liquid of second color;

said fluid means filling said first sealed passage means, said second type holes of said medial sheet and said second sealed passage means;

a plurality of first addressing means each of which being electrically connected to a corresponding one of said plurality of first conductive means;

means for activating selective ones of said plurality of first addressing means;

a plurality of second addressing means each of which being electrically connected to a corresponding one of said plurality of second conductive means;

means for activating selective ones of said plurality of second addressing means;

a plurality of electrode addressing means each of which being electrically connected to a corresponding one of said plurality of electrodes of said first sheet and to a corresponding electrode of said medial sheet;

means for activating selective ones of said plurality of electrode addressing means; and said plurality of electrodes of said first sheet, said plurality of electrodes of said medial sheet, said first conductive means and said second conductive means being so constructed and arranged relative to each other and said plurality of sets of at least two first type holes that when each one of said plurality of electrodes of said first sheet, a corresponding one of said plurality of electrodes of said second sheet and a corresponding one of said plurality of first conductive means are activated, said liquid means of first color in a corresponding hole will flow into said sealed passage means causing displacement of adjacent said fluid means through said first and second sealed passage means and corresponding said second type holes, when each one of said plurality of electrodes of said first sheet, a corresponding one of said plurality of electrodes of said medial sheet and a corresponding one of said plurality of second conductive means are activated, said liquid means of second color in a corresponding hole will flow into said sealed passage means causing displacement of adjacent said fluid means through said first and second sealed passage means and corresponding said second type holes and when each one of said plurality of electrodes of said first sheet, a corresponding one of said plurality of electrodes of said medial sheet, a corresponding one of said plurality of first conductive means and a corresponding one of said plurality of second conductive means are activated, said liquid means of first color in a corresponding hole and said liquid means of second color in a corresponding hole both will flow into said sealed passage means causing displacement of adjacent said fluid means through said first and second sealed passage means and corresponding said second type holes.

4. The color display device as recited in claim 3, wherein each of said plurality of electrodes of said medial sheet completely surrounds a corresponding set of at least two first type holes.

5. The addressable display device as recited in claim 3, wherein each of said second type holes is surrounded by a plurality of adjacent said electrodes of said medial sheet.

6. The display device as recited in claim 3, wherein said electrodes of said first sheet are covered by a first insulating layer and said electrodes of said medial sheet are covered by a second insulating layer.

7. The addressable display device recited in claim 3, wherein said first sheet is transparent.

8. The addressable display device recited in claim 3, wherein said medial sheet is transparent.

9. The addressable display device recited in claim 3, wherein said second sheet is transparent.

* * * * *